Dec. 7, 1954   P. R. TARR   2,696,116
THERMOCOUPLE PICKUP SYSTEM FOR ACCURATE MEASUREMENT
OF TEMPERATURE IN MACHINE PARTS
Filed May 16, 1952   2 Sheets-Sheet 1

Inventor
PHILIP R. TARR

United States Patent Office 2,696,116
Patented Dec. 7, 1954

2,696,116

THERMOCOUPLE PICKUP SYSTEM FOR ACCURATE MEASUREMENT OF TEMPERATURE IN MACHINE PARTS

Philip R. Tarr, Cuyahoga County, Ohio

Application May 16, 1952, Serial No. 288,367

6 Claims. (Cl. 73—351)

(Granted under Title 35, U. S. Code (1952), sec. 266)

The invention described herein may be manufactured and used by or for the Government of the United States of America for governmental purposes without the payment of any royalties thereon or therefor.

This invention relates to temperature measurement by thermocouples at high rotational speeds.

The measurement of temperature in revolving mechanism such as airplane propellers presents difficulty in that electric circuit connections must usually be established from the moving points to the meter through revolving connections and dissimilar metals which usually give rise to so-called "parasitic" voltages causing inaccurate meter readings. Heretofore, it has been proposed to bridge the moving stationary gap by electromagnetic means such as an inductive transforming system using moving and stationary coils; but the necessity for adjunct, compensatory apparatus involving time delays in adjustment, has hindered acceptance of this arrangement.

Generally stated, the invention consists in improved structure and circuit arrangement for securing accurate temperature readings of machine parts rotating at high speeds by use of a system of thermocouples in bridge relationship.

An object of the present invention is to provide temperature measurement apparatus for revolving mechanism which eliminates parasitic voltages in thermocouple circuits containing moving parts. Another object is to provide a circuit for eliminating parasitic voltages which is characterized by marked simplicity in arrangement. It is an object also to provide thermocouple temperature indicating means which are readily applicable to temperature determination of a number of spaced points on revolving machine parts.

Other objects and many of the attendant advantages of this invention will be readily appreciated as the same becomes better understood by reference to the following detailed description when considered in connection with the accompanying drawings wherein.

Figures 1, 2:
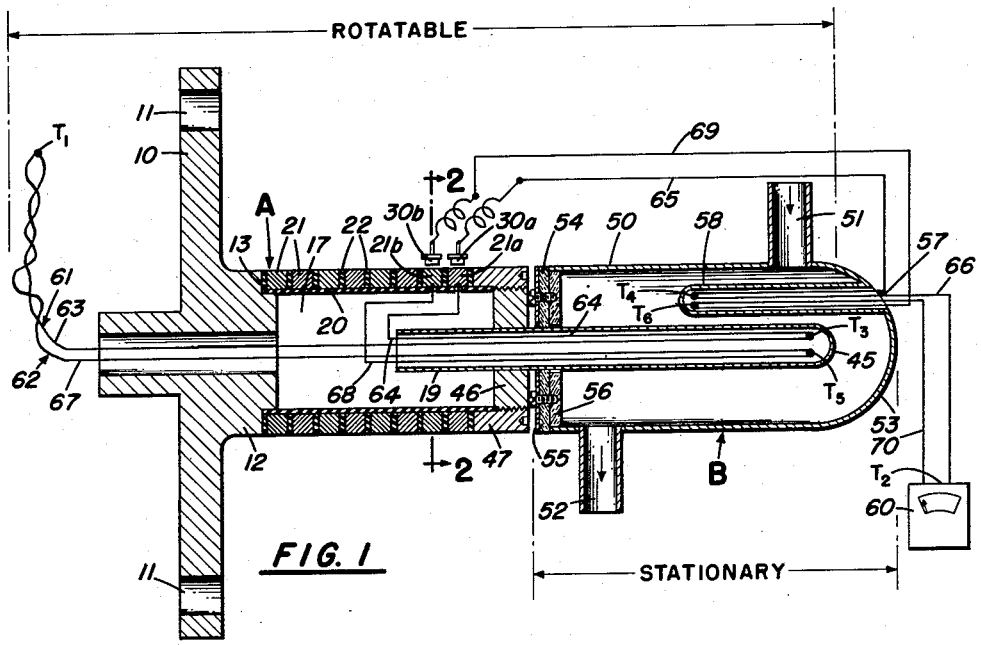
Fig. 1 is a view in longituidnal section of the temperature indicating unit, showing the thermocouple placements.
Fig. 2 is a sectional view through the unit taken along lines 2—2 of Fig. 1 and showing the slipring-brush construction.

On reference to Fig. 1 it will appear that the temperature device has two diverse structural parts, A and B, the rotational part A being indicated by upper broken lines and the stationary part B also being indicated by broken lines on the lower side of the figure. These parts are tubular and in axial alignment.

The rotatable part A includes a wheel shaped disk 10 having edge openings 11 through which attachment to a rotatable element, such as a propeller or turbine wheel may be made. To a hub 12 having an annular recess 13, and preferably integral therewith, are two spaced allochiral cylindrical sectors 15 and 16, the flat facing surfaces 17 and 18 being spaced to form a passageway for the thermocouple conductors and the well 19 which encloses these conductors. Externally, the sectors 15 and 16 form a support for an insulation tube 20, and on this tube are mounted a series of sliprings 21 spaced from each other along the support by insulation rings 22. Adjacent each slipring is a contact brush 30 having a wire conductor contact 31 extending therefrom.

A spring strip 32 is provided as part of the brush mounting, the brush being attached to one end of the strip and the other end of the strip being fixed to the approximate mid-point of an armature follower 33, the latter being mounted pivotally on a stationary support 34. The free end of the armature follower is provided with an adjustment screw 35 for adjusting the tension and placement of the spring strip 32. As shown in Fig. 2 the follower is so mounted on the support 34 as to bring the contact 30 adjacent to but out of engagement with the slipring 21.

Means for moving the contact 30 into engagement with the slipring consists of a magnet coil unit 36, including a coil 37, a slidable core 38, an adjustable end screw 39 and a coil spring 40 between the screw and core for holding the contact normally out of contact with the slipring. By appropriate selection of coil current and adjustment of screws 35 and 39 the contact 30 may be held normally free but capable of being brought at will into ring contact with adequate tension by means of coil conductors 41, leading to current supply 42 and a conventional operating switch 43.

The conductor well 19 is made preferably of stainless steel to reduce thermal conductivity and is highly polished to improve heat reflection. The well is in the form of a small tube with one end 45 closed in rounded contour to reduce heat losses and the diameter as small as possible and still contain the thermocouple leads. The open end of the well is supported within the A part of the device by the apertured outer-threaded disk-fitting 46, and annular end ring 47, the disk-fitting being preferably integral with hub sectors 15 and 16. The well tube fits closely inside the disk aperture and the well opening is about midway inside the slipring cavity, the closed end extending at least six times the well diameter within the steam tank 50.

The steam tank 50 is also made of highly polished metal with rounded corners and has an inlet port 51 and an outlet port 52, the outlet port being preferably on the tank bottom, as shown, to facilitate drainage of condensate. Fig. 1 shows the tank 50 as closed at one end 53 by a rounded integral cap, and at the other end by a metal disk 55 lined with heat insulating disks 54 and 56, all disks being apertured in line to receive in close fit the well 19 and thus provide a support for the protruding tank.

At the closed tank end 53, in an opening 57 therein, is inserted a second well 58, the open well end being secured to the opening edge and the closed end extending within the tank at least to a distance of six times the well diameter. Both wells are preferably in parallel alignment and with their end sections in the general line of fluid flow in the tank from inlet 51 to outlet 52.

Six thermocouples are employed in the metering circuit including the revolving thermocouple $T_1$ at the point of desired temperature indication, the reference thermocouple $T_2$ at the direct reading meter 60, and two pairs of thermoscouples in each of two conducting circuits 61 and 62 between the $T_1$ and $T_2$ thermocouples. Circuit 61 includes conductor 63 between thermocouple $T_1$ and a thermocouple $T_3$, positioned near the closed end of the well 19. Another conductor 64 extends from thermocouple $T_3$ to one of the sliprings 21a. A third conductor 65 joins the brush 30a to thermocouple $T_4$ in the well 58. Conductor 66 connects $T_4$ to the meter.

In the second circuit, 62, conductor 67 joins thermocouple $T_1$ with the thermocouple $T_5$ in well 19; conductor 68 connects $T_5$ with slipring 21b adjacent slipring 21a; conductor 69 connects brush 30b with thermocouple $T_6$ in well 58; and conductor 70 connects thermocouple $T_6$ to thermocouple $T_2$ in meter 60.

It is important to note at this point the composition of the various thermocouples and conductors and the slipring-brush units. Thermocouple $T_1$ is formed of a Chromel-Alumel junction, Alumel being an aluminum-nickel alloy and Chromel a chromium-nickel alloy. Circuit 61 from thermocouple $T_1$ includes the following metals: conductor 63 Chromel, thermocouple $T_3$ Chromel-copper, conductor 64, slipring 21a, brush 30a, and conductor 65 all of copper, thermocouple $T_4$ copper-Chromel, thermocouple $T_2$ Chromel-Alumel. Similarly circuit 62 from thermocouple $T_1$ consists of the following metals:

conductor 67 Alumel, thermocouple $T_5$ Alumel-copper, conductor 68, slipring 21$b$, brush 30$b$ and conductor 69 all of copper, thermocouple $T_6$ copper-Alumel, and conductor 70, Alumel. Thus, it may be seen that the indicating thermocouple $T_1$ and the reference thermocouple $T_2$ are both of Chromel-Alumel elements and that in each circuit between these two end thermocouples are two thermocouples of identical elements but connected in opposition.

It is now apparent that the problem of parasitic thermal voltages developing at the slipring-brush junction is met by making the slip contacts of identical highly conducting metals such as copper or silver. Experiment has demonstrated that with copper to copper in these contacts the undesirable unstable voltages due to heat or relative sliding at the point of contact, or thermal conduction from the rotating machine element, are reduced to a negligible value. In order to have copper to copper at the slipring-brush contacts it is necessary to use copper-Alumel and copper-Chromel thermocouples to make the changeover. Since these voltages would normally disturb the indicating voltage of the $T_1$ thermocouples, it is important that these additional voltages be neutralized; and this is done by placing the two transitional Chromel-copper thermocouples $T_3$ and $T_4$ and the two transitional Alumel-copper thermocouples $T_5$ and $T_6$ all together in the tank 50 and passing a fluid, such as steam through the tank, by way of inlet 51 and outlet 52, so that all of the transitional thermocouples $T_3$, $T_4$, $T_5$, and $T_6$, are held at the same temperature. Since, moreover, the thermocouple pairs $T_3$, $T_4$ and $T_5$, $T_6$ are opposed in voltage relation, the result is zero voltage for these added thermocouples. Thus, $T_1$ thermocouple only is effective on the meter 60.

While both copper and silver slide junctions have been mentioned as desirable, copper is preferred as silver junctions would require silver conductors between the slide contact unit and the adjacent secondary thermocouples.

In operating the apparatus, one or more points on the rotor, as a propeller blade, are selected for temperature test and thermocouples $T_1$ placed at these points by any appropriate means. The thermocouple leads of each thermocouple are then connected to circuit connections as described including one of the sliprings 21 and brushes 30 and the machine operated at the desired revolutions per minute. In the meantime, steam flow, at a rate sufficient to obtain a good blow, has produced a temperature condition in the thermocouples $T_3$, $T_4$, $T_5$ and $T_6$ which is uniform but not necessarily constant. The slipring-brush switch may then be closed and readings taken on the meter, which may be of the direct reading potentiometer type, the values being the $T_1$ voltages with negligible deviation from parasitic voltages.

It is noted that the steam flow in the tank 50 is not critical as it is necessary only that the transitional thermocouples be held at a uniform temperature. Also while steam is mentioned many other fluids are usable including carburetted water or alcohol or various liquids. The well metal and the diameter and shape of the well tubes is such as to reduce heat flow and thus tend to maintain static heat conditions. The placement of the closed well ends a distance from the tank ends of at least six times their diameters secures a "depth of immersion" reinforcing the desired heat conditions.

Also, reference is made to the cooperative function of the normally open slipring-brush assembly in permitting high test speeds without destructive wear. By making contact only on test observations it has been possible to secure hundreds of readings at rotational speeds of 20,000 R. P. M. for 1.5 inch rings and 11,000 R. P. M. for 1 inch rings. The accuracy of the described method is sufficiently high to be beyond ordinary requirements. At 20,000 R. P. M. readings within 3.0° F. of the true value have been obtained, and in special cases, within 1.5° F.

Figure 3:
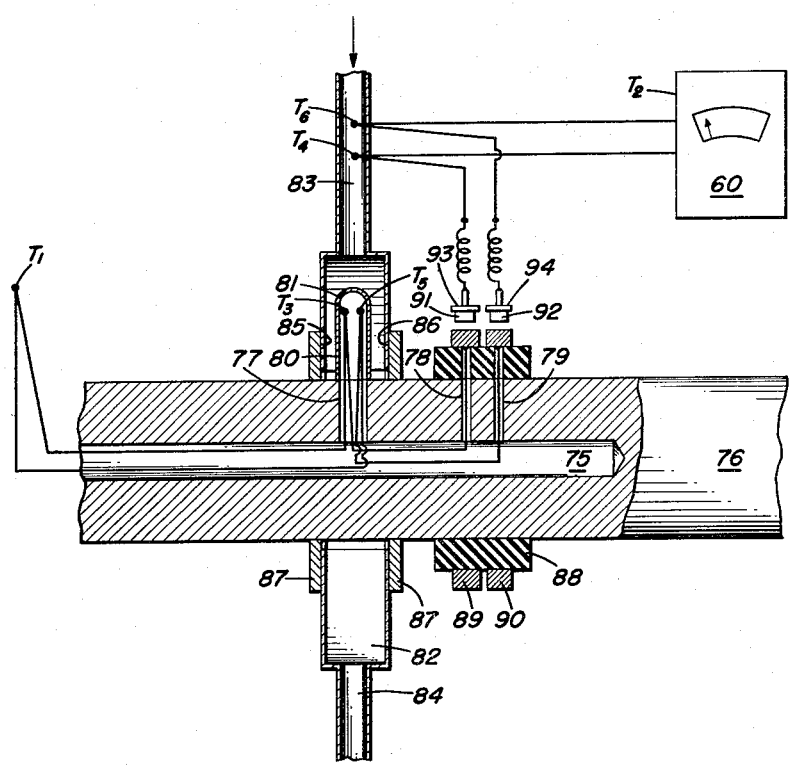
Fig. 3 is a view, partly in section, of a modified arrangement of the invention.

In Fig. 3 a modification of the indicator unit is disclosed applicable to conditions where it is impossible to connect the tank unit in line with the shaft. In this arrangement an axial bore 75 in shaft 76 serves as the conductor well and from this bore three side openings 77, 78 and 79 are made. A small tube 80, having a closed end 81, is connected radially to opening 77, with the closed end on the outside. A hollow shroud ring 82 mounted on a stationary support and having a tube inlet 83 and tube outlet 84 encloses the shaft in the region including tube 80 and serves for the steam tank, the inner side edges 85 and 86 of this ring being clear of the shaft and the opening between these edges and the shaft being closed by flat felt rings 87 attached to the shaft and rotating in close proximity to these edges.

Insulation ring 88 is fixed around the shaft adjacent the tank and two slip rings 89 and 90 mounted thereon. Brushes 91 and 92 are placed in adjacency to these sliprings and provided with strip holders 93 and 94 as in the preferred construction. Electromagnet actuating devices as in Fig. 2 are employed to move these brushes into ring engagement to complete the electrical circuit. For large sliprings it may be preferable to use silver-graphite brushes plated with copper.

In this form of the invention the thermocouple $T_1$ is placed on the rotatable member, the temperature of which is to be determined, thermocouples $T_3$ and $T_5$ are placed near the closed end of tube 80, and thermocouples $T_4$ and $T_6$ in the inlet of the steam tank so that four thermocouples $T_3$, $T_4$, $T_5$ and $T_6$ take on, in use, a uniform temperature. The circuit metals and meter are similar to those previously described.

While in both forms of the disclosure a single test circuit is described, it is obvious that numerous multiplications of these units may be made, from thirty to as much as a hundred units being practicable.

Obviously many modifications and variations of the present invention are possible in the light of the above teachings. It is therefore to be understood that within the scope of the appended claims the invention may be practiced otherwise than as specifically described.

I claim:

1. In a temperature indicator for a rotary device, a first thermocouple adapted for placement on a rotatable element of said device; a meter mounted on a stationary support and including a reference thermojunction; two electrical conductor circuits between the diverse elements of said first thermocouple and said thermojunction; a slipring-brush unit in each of said circuits, each unit consisting of a pair of relatively rotatable elements and one element of each of said units being attached to said rotatable element and the other elements having stationary supports; two additional thermocouples in each of said circuits, one additional thermocouple connecting the first thermocouple and the slipring-brush unit and the other additional thermocouple connecting the slipring-brush unit and the thermojunction; the metals of the two slipring-brush units being identical, the diverse metals of the first thermocouple being identical to the diverse metals in the thermojunction, said one additional thermocouple including the metal of the slipring-brush unit and one metal of the first thermocouple, and said other additional thermocouple including a metal of said thermojunction and the metal of the slipring-brush unit and means for holding the temperatures of said additional thermocouples at the same value including an inlet connection for heat energy and means for supplying said heat energy in approximately equal amounts to each of the two additional thermocouples of each circuit.

2. The temperature indicator as defined in claim 1 with said temperature holding means for said additional thermocouples comprising a tank for containing said additional thermocouples; and inlet and outlet openings on said tank for transmitting a temperature controlling fluid therethrough.

3. The temperature indicator as defined in claim 2 with a tubular casing enclosing each of said additional thermocouples, whereby rapid temperature changes in said thermocouples are prevented.

4. The temperature indicator as defined in claim 3 with said casings each constructed of material having a low thermal conductivity.

5. The temperature indicator as defined in claim 3 with one of said casings being attached to said rotatable element and in approximate alignment with the axis thereof.

6. The temperature indicator as defined in claim 3 with one of said casings being attached to the shaft of said rotatable element and at right angles to the axis thereof, and said tank having the form of an annulus surrounding said shaft and enclosing said casing.

(References on following page)

References Cited in the file of this patent

UNITED STATES PATENTS

| Number | Name | Date |
|---|---|---|
| 1,046,925 | Wilson | Dec. 10, 1912 |
| 1,304,277 | Des Isles | May 20, 1919 |
| 1,981,548 | Haven | Nov. 20, 1934 |

OTHER REFERENCES

Journal of Scientific Instruments, vol. 1, #10, pp. 310–314, July 1924.

Motortechnische Zeitschrift, vol. 1, 1939, pp. 90, 91, 126 and 127.